(12) United States Patent
Arakawa et al.

(10) Patent No.: US 8,113,253 B2
(45) Date of Patent: Feb. 14, 2012

(54) NON-PNEUMATIC TIRE

(75) Inventors: Koji Arakawa, Osaka (JP); Masanori Iwase, Osaka (JP); Masahiro Segawa, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 141 days.

(21) Appl. No.: 12/624,533

(22) Filed: Nov. 24, 2009

(65) Prior Publication Data
US 2010/0132858 A1  Jun. 3, 2010

(30) Foreign Application Priority Data

Nov. 28, 2008  (JP) .................................. 2008-304656

(51) Int. Cl.
*B60C 7/00* (2006.01)
(52) U.S. Cl. ............ 152/246; 152/301; 152/11; 152/323
(58) Field of Classification Search .................. 152/5, 7, 152/246, 40, 11, 300–301, 323–329, 12, 152/17, 20, 41–44, 47, 49, 80, 1, 270, 275, 152/315, 258; 301/5.301, 5.304, 5.308; 492/42
See application file for complete search history.

(56) References Cited

U.S. PATENT DOCUMENTS

| | | | | | |
|---|---|---|---|---|---|
| 811,232 | A | * | 1/1906 | Lang et al. ..................... | 152/328 |
| 1,378,303 | A | * | 5/1921 | Willmon .......................... | 152/69 |
| 4,945,962 | A | * | 8/1990 | Pajtas ................................ | 152/7 |
| 5,042,544 | A | * | 8/1991 | Dehasse .......................... | 152/302 |
| 6,615,885 | B1 | * | 9/2003 | Ohm ................................ | 152/11 |
| 2002/0124929 | A1 | | 9/2002 | Rhyne et al. | |
| 2003/0121581 | A1 | | 7/2003 | Thompson et al. | |
| 2004/0012246 | A1 | | 1/2004 | Rhyne et al. | |
| 2004/0159385 | A1 | | 8/2004 | Rhyne et al. | |
| 2006/0113016 | A1 | | 6/2006 | Cron et al. | |
| 2007/0267116 | A1 | | 11/2007 | Rhyne et al. | |
| 2008/0053586 | A1 | | 3/2008 | Hanada et al. | |
| 2008/0314486 | A1 | * | 12/2008 | Manesh et al. ................. | 152/328 |
| 2010/0132865 | A1 | * | 6/2010 | Iwase et al. ..................... | 152/301 |
| 2010/0200131 | A1 | * | 8/2010 | Iwase et al. ................ | 152/209.1 |

FOREIGN PATENT DOCUMENTS

| | | |
|---|---|---|
| JP | 01-314602 | 12/1989 |
| JP | 2005-500932 | 1/2005 |
| JP | 3966895 | 6/2007 |

* cited by examiner

*Primary Examiner* — Jason Bellinger
(74) *Attorney, Agent, or Firm* — Fish & Richardson P.C.

(57) ABSTRACT

The invention provides a non-pneumatic tire which can improve a riding quality, a noise performance and the like while improving a durability, and can further sufficiently suppress a buckling of a ground portion between spokes, because a circumferential fluctuation of a tire rigidity is hard to be generated due to a positional relationship between a spoke position and a center position of the ground surface, and a strain can be dispersed into each of portions of a support structure body. In a non-pneumatic tire T comprising a support structure body SS supporting a load from a vehicle, the support structure body SS includes an inner annular portion 1, an intermediate annular portion 2 concentrically provided in an outer side of the inner annular portion 1, an outer annular portion 3 concentrically provided in an outer side of the intermediate annular portion 2, a plurality of inner coupling portions 4 coupling the inner annular portion 1 and the intermediate annular portion 2, and a plurality of outer coupling portions 5 coupling the outer annular portion 3 and the intermediate annular portion 2, and the number of the outer coupling portions 5 is larger than the number of the inner coupling portions 4.

6 Claims, 7 Drawing Sheets

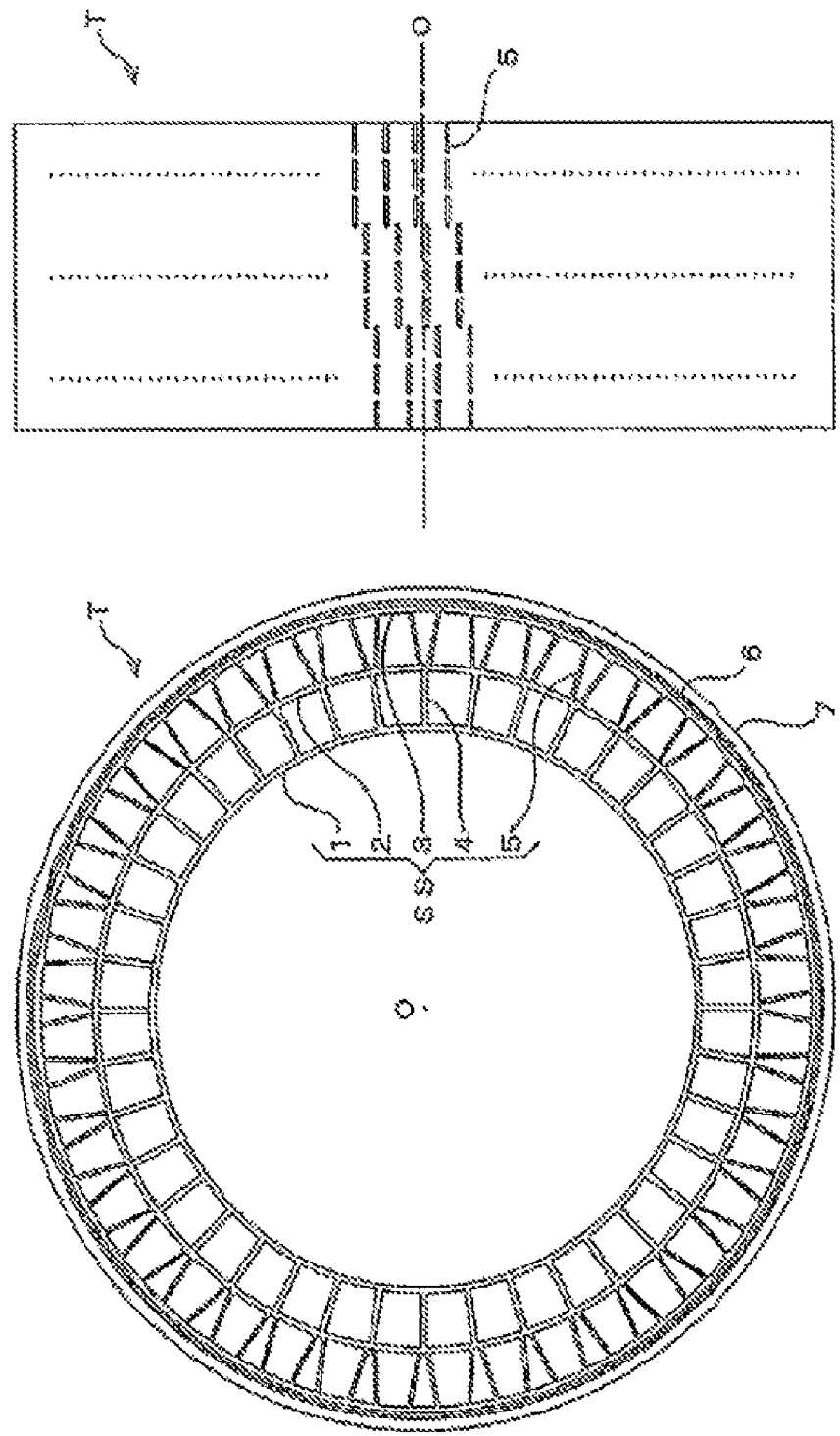

NON-PNEUMATIC TIRE

BACKGROUND OF THE INVENTION

1. Field of the Invention

The present invention relates to a non-pneumatic tire provided with a support structure body supporting a load from a vehicle, serving as a tire structure member, and preferably relates to a non-pneumatic tire which can be used in place of a pneumatic tire.

2. Description of the Related Art

A pneumatic tire has a function of supporting a load, a performance of absorbing a shock from a ground surface, and a performance of transmitting a power (accelerating, stopping and direction changing performance), and is accordingly employed in various vehicles, particularly a bicycle, a motor cycle, an automobile and a truck.

Particularly, these capabilities greatly have contributed to a development of the automobile and other motor vehicles. Further, the shock absorbing performance of the pneumatic tire is useful in a transportation cart for medical equipment and an electronic device, and for other intended uses.

As a conventional non-pneumatic tire, for example, a solid tire, a spring tire, a cushion tire and the like exist, however, they do not have an excellent performance of the pneumatic tire. For example, the solid tire and the cushion tire support the load based on a compression of a ground portion, however, this kind of tire is heavy and rigid, and does not have a shock absorbing performance like the pneumatic tire. Further, in the non-pneumatic tire, it is possible to improve the cushion performance by enhancing elasticity, however, there is a problem that such a load support performance or durability of the pneumatic tire is deteriorated.

Accordingly, in Japanese Unexamined Patent Publication No. 2005-500932, there is proposed a non-pneumatic tire having a reinforced annular band supporting a load applied to a tire, and a plurality of web spokes transmitting a load force by a tensile force between the reinforced annular band and a wheel or a hub, for the purpose of developing a non-pneumatic tire having a similar operating characteristic to the pneumatic tire.

However, in the non-pneumatic tire described in Japanese Unexamined Patent Publication No. 2005-500932, it has been known that a fluctuation of a vertical load tends to be generated due to a positional relationship between a position of the web spoke and a center position of the ground surface, in the case where the vertical load is applied so as to have an identical deflection amount. In other words, in the case where the center position between the web spokes S is positioned at the center TC of the ground surface as shown in FIG. 7A, a reaction force from the tire becomes small (soft), and in the case where a position of a lower end of the web spoke S is positioned at the center TC of the ground surface as shown in FIG. 7B, the reaction force from the tire becomes large (rigid), a circumferential fluctuation of the tire rigidity (which may be, hereinafter, simply referred to as rigidity fluctuation) is seen in a ground state between the both. As a result, there is a risk that uniformity is deteriorated, and various performances are deteriorated due to an uneven grounding.

Further, since the non-pneumatic tire described in Japanese Unexamined Patent Publication No. 2005-500932 has a space between the web spokes which are adjacent in the circumferential direction, the rigidity of the annular band becomes low in a region between the web spokes. Accordingly, the annular band generates a buckling between the web spokes at the time of grounding, and there is a problem that the annular band runs into destruction in addition to a vibration and noise, and an abnormal abrasion of a tread.

In order to suppress such a circumferential fluctuation of the tire rigidity, and in order to prevent the buckling of the ground portion between the web spokes, Japanese Patent No. 3966895 describes a non-pneumatic tire configured by forming a spoke structure body in which fins coupling between an annular outer peripheral member and an inner peripheral member in a diametrical direction are intermittently arranged so as to be spaced in a circumferential direction as a unit structure body which is divided into a plurality of zones in a tire width direction, shifting the positions of the fins in the circumferential direction between the unit structure bodies, forming the unit structure body as a unit structure body which is divided in a plurality of sections in the circumferential direction, and integrating and bonding all the unit structure bodies. The non-pneumatic tire is structured such that the fins which are shifted from each other in the circumferential direction act on an improvement of a rigidity of the outer peripheral member between the fins in the adjacent zones, thereby making the circumferential fluctuation of the tire rigidity small, and suppressing the buckling of the outer peripheral member.

Further, in Japanese Unexamined Patent Publication No. 1-314602, there is described a non-pneumatic tire in which an inner peripheral ring and an outer peripheral ring are coupled by a ring plate shaped web, and a side surface of the web is provided with a rib coupled to the inner peripheral ring and the outer peripheral ring as well as being coupled to the side surface so as to extend sideways.

SUMMARY OF THE INVENTION

However, it has been known that the non-pneumatic tire described in Japanese Patent No. 3966895 has a similar structure to the non-pneumatic tire described in Japanese Unexamined Patent Publication No. 2005-500932, in the individual zone, and is not sufficient in an effect of suppressing the buckling of the ground portion between the web spokes. Further, in the non-pneumatic tire described in Japanese Patent Unexamined Publication No. 1-314602, since the web extending in a radial direction is arranged in the center portion in the width direction of the rib over the tire circumference, the compression rigidity becomes too high, and an adverse effect is given to a ground pressure dispersion, a riding quality, a noise and the like. Further, since the load is directly transmitted to the ground surface structurally in the ground side, it is impossible to expect an improvement in rigidity fluctuation and the ground pressure dispersion.

Accordingly, an object of the present invention is to provide a non-pneumatic tire which can improve a riding quality, a noise performance and the like while improving a durability, and can further sufficiently suppress a buckling of a ground portion between spokes, because a circumferential fluctuation of a tire rigidity is hard to be generated due to a positional relationship between a spoke position and a center position of the ground surface, and a strain can be dispersed into each of portions of a support structure body.

The object mentioned above can be achieved by the present invention described as follows.

In other words, in accordance with the present invention, there is provided a non-pneumatic tire comprising:

a support structure body supporting a load from a vehicle, wherein the support structure body includes: an inner annular portion, an intermediate annular portion concentrically provided in an outer side of the inner annular portion, an outer annular portion concentrically provided in an outer side of the intermediate annular portion, a plurality of inner coupling portions coupling the inner annular portion and the intermediate annular portion, and a plurality of outer coupling portions coupling the outer annular portion and the intermediate annular portion, and wherein the number of the outer coupling portions is larger than the number of the inner coupling portions.

Since the non-pneumatic tire according to the present invention is provided with the intermediate annular portion, it is possible to burden the intermediate annular portion with the deformation (the strain) concentrated in the outer coupling portion, at the time when the position of the coupling portion between the outer coupling portion and the outer annular portion is grounded, and it is possible to uniformize the deformation of the support structure body. As a result, in the non-pneumatic tire according to the present invention, the circumferential fluctuation of the tire rigidity is hard to be generated by the positional relationship between the position of the outer coupling portion (the spoke) and the center position of the ground surface, and it is possible to suppress the buckling of the ground portion between the outer coupling portions. In addition, since the number of the outer coupling portions is larger than the number of the inner coupling portions, the interval between the adjacent outer coupling portions becomes narrow, and it is possible to further suppress the buckling of the ground portion between the outer coupling portions.

In the non-pneumatic tire according to the present invention, it is preferable that the outer coupling portion is inclined with respect to the tire diametrical direction. Since the outer coupling portion is inclined with respect to the tire diametrical direction, it is possible to burden the intermediate annular portion with the deflection of the outer coupling portion in comparison with the case where the outer coupling portion is the same as the tire diametrical direction, at the time when the position of the coupling portion between the outer coupling portion and the outer annular portion is grounded, and it is possible to uniformize the deformation of the support structure body. As a result, the circumferential fluctuation of the tire rigidity is hard to be generated by the positional relationship between the position of the outer coupling portion and the center position of the ground surface, and it is possible to improve the noise caused by a rolling motion and the riding quality.

In the non-pneumatic tire according to the present invention, it is preferable that the two outer coupling portions inclined in a direction which is symmetrical with respect to a tire diametrical direction, and the one inner coupling portion along the tire diametrical direction are arranged in a Y-shaped form as seen from a tire axial direction. Since two outer coupling portions and one inner coupling portion are arranged in the Y-shaped form, the coupling portion between the outer coupling portion and the intermediate annular portion comes close to the coupling portion between the inner coupling portion and the intermediate annular portion. Accordingly, it is possible to burden the intermediate annular portion with the deflection of the outer coupling portion accurately. Therefore, it is possible to improve the circumferential fluctuation of the tire rigidity, the suppression of the buckling, and the performances such as the durability, the rolling resistance and the like. Further, since the coupling portion between the outer coupling portion and the intermediate annular portion comes close to the coupling portion between the inner coupling portion and the intermediate annular portion, the tensile forces tend to be transmitted from each other, and the load supporting performance is increased.

In the non-pneumatic tire according to the present invention, it is preferable that a thickness of the outer coupling portion is less than a thickness of the inner coupling portion. It is possible to reduce the compression rigidity by making the thickness of the outer coupling portion smaller than the thickness of the inner coupling portion, and it is possible to well suppress the circumferential fluctuation of the tire rigidity. In the present invention, since the number of the outer coupling portions is larger than the number of the inner coupling portions, the compression rigidity of the outer coupling portion is too high if the thickness of the outer coupling portion is equal to or larger than the thickness of the inner coupling portion, so that there is a risk that the suppressing effect of the circumferential fluctuation of the tire rigidity is lowered.

In the non-pneumatic tire according to the present invention, it is preferable that a gap is provided between an outer coupling point at which one of the two outer coupling portions and the intermediate annular portion are coupled, and an outer coupling point at which the other of the outer coupling portions and the intermediate annular portion are coupled. In the case where two outer coupling portions and one inner coupling portion are arranged in the Y-shaped form as seen from the tire axial direction, the compression force of the inner coupling portion is hard to be directly transmitted to the outer coupling portion by setting the gap between the outer coupling point at which one outer coupling portion and the intermediate annular portion are coupled, and the outer coupling point at which the other outer coupling portion and the intermediate annular portion are coupled, whereby it is possible to prevent the strain in the outer coupling portion from being enlarged. Further, it is possible to burden the intermediate annular portion between two outer coupling points with the tensile force of the inner coupling portion and the outer coupling portion, by setting the gap therebetween. Further, it is assumed that the outer coupling point is a point at which a thickness center line of the outer coupling portion intersects a thickness center line of the intermediate annular portion.

In the non-pneumatic tire according to the present invention, it is preferable that an angle of the outer coupling portion with respect to the tire diametrical direction is not more than 30°. The non-pneumatic tire can obtain a sufficient rigidity by making the angle of the outer coupling portion with respect to the tire diametrical direction not less than 30°, and the tensile force tends to be transmitted between the inner coupling portion and the outer coupling portion.

BRIEF DESCRIPTION OF THE DRAWINGS

FIGS. 6A and 6B are a front elevational view and a side elevational view showing a non-pneumatic tire according to the other embodiment.

DETAILED DESCRIPTION OF THE PREFERRED EMBODIMENTS

Hereinafter, an embodiment according to the present invention will be described with reference to the drawings.

Figure 1:
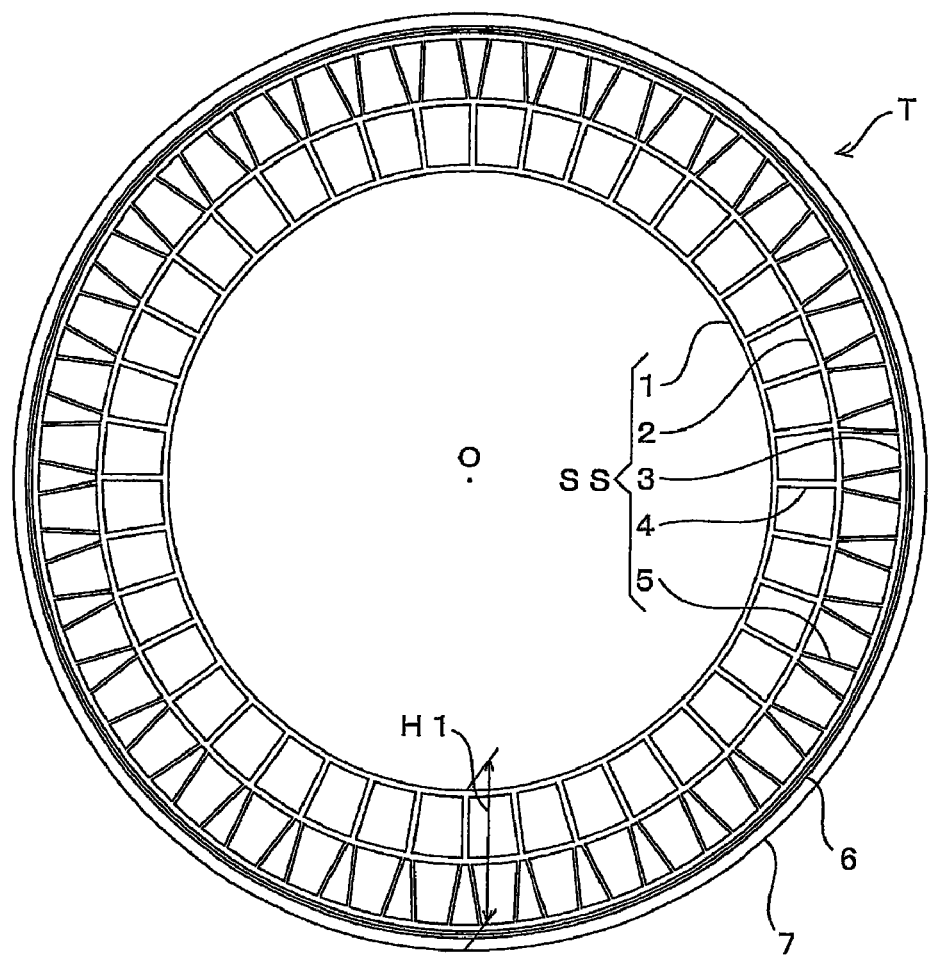
FIG. 1 is a front elevational view showing an example of a non-pneumatic tire according to the present invention.
Figure 2:
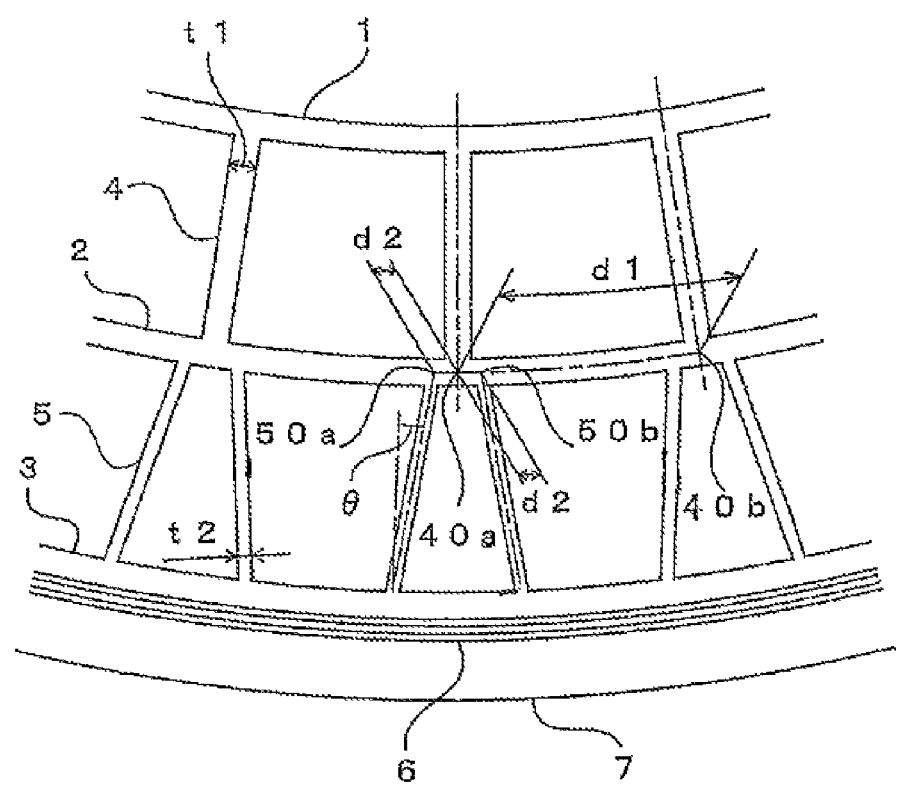
FIG. 2 is a partly enlarged view showing a main part of FIG. 1.

First, a description will be given of a structure of a non-pneumatic tire T according to the present invention. FIG. 1 is a front elevational view showing an example of the non-pneumatic tire T. FIG. 2 is a partly enlarged view showing a main part of FIG. 1. In this case, reference symbol O denotes an axial core, and reference symbol H1 denotes a tire cross sectional height, respectively.

The non-pneumatic tire T is provided with a support structure body SS supporting a load from a vehicle. It is sufficient for the non-pneumatic tire T according to the present invention to include such an support structure body SS, and the non-pneumatic tire T may also include a member corresponding to a tread, a reinforcing layer, a member for adapting to an axle and a rim, and the like at an outer side (outer periphery side) or an inner side (inner periphery side) of the support structure body SS.

In the non-pneumatic tire T according to the present embodiment, as shown by the front elevational view in FIG. 1, the support structure body SS is provided with an inner annular portion 1, an intermediate annular portion 2 provided concentrically in an outer side thereof, an outer annular portion 3 provided concentrically in an outer side thereof, a plurality of inner coupling portions 4 coupling the inner annular portion 1 and the intermediate annular portion 2, and a plurality of outer coupling portions 5 coupling the outer annular portion 3 and the intermediate annular portion 2.

In view of improving uniformity, the inner annular portion 1 is preferably formed in a cylindrical shape having a fixed thickness. Further, projections and depressions or the like for maintaining a fitting performance is preferably provided in an inner peripheral surface of the inner annular portion 1, for installing to the axle or the rim.

A thickness of the inner annular portion 1 is preferably set between 2 and 7%, and more preferably set between 3 and 6%, in view of achieving weight saving and an improvement in durability while sufficiently transmitting a force to the inner coupling portion 4.

An inner diameter of the inner annular portion 1 is appropriately determined in correspondence to a dimension or the like of the rim or the axle to which the non-pneumatic tire T is installed, however in the present invention, the inner diameter of the inner annular portion 1 can be made substantially smaller than the conventional one, for including the intermediate annular portion 2. In the case of assuming a substitution of the general pneumatic tire, the inner diameter is preferably between 250 and 500 mm, and more preferably between 330 and 440 mm.

The width in the axial direction of the inner annular portion 1 is appropriately determined in correspondence to an intended use, a length of the axle or the like, however, in the case of assuming a substitution of the general pneumatic tire, the width is preferably between 100 and 300 mm, and more preferably between 130 and 250 mm.

A tensile modulus of the inner annular portion 1 is preferably set between 5 and 180000 MPa, and more preferably set between 7 and 50000 MPa, in view of achieving weight saving, an improvement in durability and an installing characteristic while sufficiently transmitting the force to the inner coupling portion 4. Note that the tensile modulus in the present invention is a value obtained by carrying out a tensile test according to JIS K7312 and calculating from a tensile stress at the time of elongating at 10%.

The support structure body SS in the present invention is formed by an elastic material, however, it is preferable in view of capability of integrally forming at the time of manufacturing the support structure body SS, that the inner annular portion 1, the intermediate annular portion 2, the outer annular portion 3, the inner coupling portion 4 and the outer coupling portion 5 are basically made of the same material except the reinforcing structure.

The elastic material in the present invention indicates a material in which a tensile test is carried out according to JIS K7312, and a tensile modulus calculated from the tensile stress at the time of 10% elongation is not more than 100 MPa. As the elastic material of the present invention, the tensile modulus is preferably between 5 and 100 MPa, and more preferably between 7 and 50 MPa, in view of applying a suitable rigidity while obtaining a sufficient durability. As the elastic material used as the base material, a thermoplastic elastomer, a cross linked rubber, and the other resins can be listed up.

As the thermoplastic elastomer, there can be listed up a polyester elastomer, a polyolefin elastomer, a polyamide elastomer, a polystyrene elastomer, a polyvinyl chloride elastomer, a polyurethane elastomer and the like. As a rubber material constructing the cross linked rubber material, there can be listed up synthetic rubbers such as a styrene butadiene rubber (SBR), a butadiene rubber (BR), an isoprene rubber (IIR), a nitrile rubber (NBR), a hydrogenation nitrile rubber (a hydrogenation NBR), a chloroprene rubber (CR), an ethylene propylene rubber (EPDM), a fluorine-contained rubber, a silicone rubber, an acrylic rubber, an urethane rubber and the like, in addition to a natural rubber. Two or more kinds of rubber materials may be used together as necessary.

As the other resins, a thermoplastic resin, or a thermosetting resin can be listed up. As the thermoplastic resin, there can be listed up a polyethylene resin, a polystyrene resin, a polyvinyl chloride resin and the like, and as the thermosetting resin, there can be listed up an epoxy resin, a phenol resin, a polyurethane resin, a silicone resin, a polyimide resin, a melamine resin and the like.

In the elastic material mentioned above, in view of a forming and working characteristic and a cost, the polyurethane resin is preferably used. Note that a foamed material may be used as the elastic material, and a material obtained by foaming the thermoplastic elastomer, the cross linked rubber, or the other resin described above can be used.

The support structure body SS integrally formed by the elastic material is preferably structured such that the inner annular portion 1, the intermediate annular portion 2, the outer annular portion 3, the inner coupling portion 4 and the outer coupling portion 5 are reinforced by a reinforcing fiber.

As the reinforcing fiber, there can be listed up a reinforcing fiber such as a long fiber, a short fiber, a woven fiber, an unwoven fiber or the like, however, it is preferable to use a net state fiber assembly constituted by fibers arranged in the tire axial direction and fibers arranged in the tire circumferential direction, as a form using the long fiber.

As the kind of the reinforcing fiber, for example, there can be listed up a polyamide cord such as a rayon cord, a nylon-6, 6 or the like, a polyester cord such as a polyethylene terephthalate or the like, an aramid cord, a glass fiber cord, a carbon fiber, a steel cord and the like.

In the present invention, it is possible to employ reinforcement by granular filler, and reinforcement by a metal ring or the like, in addition to the reinforcement using the reinforcing fiber. As the granular filler, there can be listed up ceramics such as a carbon black, silica, an alumina or the like, other inorganic filler, or the like.

The shape of the intermediate annular portion 2 is preferably formed in a cylindrical shape having a fixed thickness, in view of improving uniformity. In this case, the shape of the intermediate annular portion 2 is not limited to the cylindrical shape, but may be set to a polygonal tubular shape and the like.

The thickness of the intermediate annular portion 2 is preferably between 3 and 10% the tire cross sectional height H1, and more preferably between 4 and 9%, in view of realizing weight saving and improvement in durability while sufficiently reinforcing the inner coupling portion 4 and the outer coupling portion 5.

The inner diameter of the intermediate annular portion 2 is beyond the inner diameter of the inner annular portion 1, and becomes less than the inner diameter of the outer annular portion 3. Assuming that L1 is a length obtained by subtracting the inner diameter of the inner annular portion 1 from the inner diameter of the outer annular portion 3, and L2 is a length obtained by subtracting the inner diameter of the inner annular portion 1 from the inner diameter of the intermediate annular portion 2, it is preferable to set the inner diameter of the intermediate annular portion 2 so that L1 and L2 satisfy the relationship $(1/3) \times L1 \leqq L2 \leqq (2/3) \times L1$.

The width in the axial direction of the intermediate annular portion 2 is appropriately determined in correspondence to an intended use or the like, however, in the case of assuming the substitution of the general pneumatic tire, the width is preferably between 100 and 300 mm, and more preferably between 130 and 250 mm.

The tensile modulus of the intermediate annular portion 2 is preferably between 8000 and 180000 MPa, and more preferably between 10000 and 50000 MPa, in view of achieving an improvement in durability and the improvement in load capacity by sufficiently reinforcing the inner coupling portion 4 and the outer coupling portion 5.

Since it is preferable that the tensile modulus of the intermediate annular portion 2 is higher than that of the inner annular portion 1, the fiber reinforcing material obtained by reinforcing the thermoplastic elastomer, the cross linked rubber, or the other resin by the fiber or the like is preferable.

The shape of the outer annular portion 3 is preferably set to a cylindrical shape having a fixed thickness, in view of improving the uniformity. The thickness of the outer annular portion 3 is preferably between 2 and 7% the tire cross sectional height H1, and more preferably between 2 and 5%, in view of achieving the weight saving and the improvement in durability while sufficiently transmitting the force from the outer coupling portion 5.

The inner diameter of the outer annular portion 3 is appropriately determined in correspondence to an intended use or the like thereof, however, in the present invention, since the intermediate annular portion 2 is provided, it is possible to make the inner diameter of the outer annular portion 3 larger than the conventional one. In this case, in the case of assuming the substitution of the general pneumatic tire, the inner diameter is preferably between 420 and 750 mm, and more preferably between 480 and 680 mm.

The width in the axial direction of the outer annular portion 3 is appropriately determined in correspondence to an intended use or the like, however, in the case of assuming the substitution of the general pneumatic tire, the width is preferably between 100 and 300 mm, and more preferably between 130 and 250 mm.

The tensile modulus of the outer annular portion 3 can be set to the same level as the inner annular portion 1 in the case where the reinforcing layer 6 is provided in the outer periphery of the outer annular portion 3, as shown in FIG. 1. In such a case where the reinforcing layer 6 is not provided, the tensile modulus is preferably between 5 and 180000 MPa, and more preferably between 7 and 50000 MPa, in view of achieving the weight saving and the improvement in durability while sufficiently transmitting the force from the outer coupling portion 5.

In the case of enhancing the tensile modulus of the outer annular portion 3, it is preferable to use the fiber reinforced material obtained by reinforcing the elastic material by the fiber or the like. The outer annular portion 3 and the belt layer or the like are sufficiently bonded by reinforcing the outer annular portion 3 by the reinforcing fiber.

The inner coupling portion 4 is structured such as to couple the inner annular portion 1 and the intermediate annular portion 2, and a plurality of inner coupling portions 4 are provided so as to be independent in the circumferential direction, for example, by setting a suitable interval between the inner annular portion 1 and the intermediate annular portion 2. In view of improving the uniformity, it is preferable that the inner coupling portions 4 are provided spaced apart at fixed intervals.

The number of the inner coupling portions 4 at the time of being provided over the entire periphery (a plurality of inner coupling portions provided in the axial direction are counted as one) is preferably between 10 and 80, and more preferably between 40 and 60, in view of achieving the weight saving, the improvement in power transmission, the improvement in durability, while sufficiently supporting the load from the vehicle. FIG. 1 shows the example where forty inner coupling portions 4 are provided.

As the shape of the individual inner coupling portion 4, there can be listed up a tabular shape, a columnar shape and the like, however, the present embodiment shows the example of the tabular shape. These inner coupling portions 4 extend in the tire diametrical direction or a direction which is inclined from the tire diametrical direction, in a front view cross section. In the present invention, an extending direction of the inner coupling portion 4 is preferably within ±25° in the tire diametrical direction, more preferably within ±15° in the tire diametrical direction, and most preferably in the tire diametrical direction, in the front view cross section, in view of improving the durability, as well as increasing a break point so as to make a rigidity fluctuation hard to be generated. FIG. 1 shows the example where the inner coupling portion 4 is arranged along the tire diametrical direction.

The thickness t1 of the inner coupling portion 4 is preferably between 2 and 12% of the tire cross sectional height H1, and more preferably between 3 and 10%, in view of achieving the weight saving, the improvement in durability, and the improvement in lateral rigidity, while sufficiently transmitting the force from the inner annular portion 1 and the intermediate annular portion 2.

The tensile modulus of the inner coupling portion 4 is preferably between 5 and 50 MPa, and more preferably between 7 and 20 MPa, in view of achieving the weight saving, the improvement in durability, and the improvement in lateral rigidity, while sufficiently transmitting the force from the inner annular portion 1.

In the case of enhancing the tensile modulus of the inner coupling portion 4, it is preferable to use the fiber reinforced material obtained by reinforcing the elastic material by the fiber or the like.

The outer coupling portion 5 is structured such as to couple the outer annular portion 3 and the intermediate annular portion 2, and a plurality of outer coupling portions are provided so as to be independent in the circumferential direction, for example, by forming a suitable interval between the outer annular portion 3 and the intermediate annular portion 2. In view of improving the uniformity, it is preferable that the outer coupling portions 5 are provided spaced apart at fixed intervals.

The number of the outer coupling portions 5 at the time of being provided over the entire periphery (a plurality of outer coupling portions provided in the axial direction are counted as one) is preferably between 30 and 150, and more preferably between 40 and 120, in view of achieving the weight saving, the improvement in power transmission, the improvement in durability, while sufficiently supporting the load from the vehicle. Further, the number of the outer coupling portions 5 is preferably plural times the number of the inner coupling portions 4. FIG. 2 shows the example where eighty outer coupling portions 5 are provided, which corresponds to twice the number of the inner coupling portions 4. In other words, the number of the outer coupling portions 5 is larger than the number of the inner coupling portions 4. As a result, the interval between the adjacent outer coupling portions 5 is narrower than the interval between the adjacent inner coupling portions 4.

As the shape of the individual outer coupling portion 5, there can be listed up a tabular shape, a columnar shape, and the like, however, the present embodiment shows the example of the tabular shape. In the present invention, it is preferable that the outer coupling portion 5 is inclined with respect to the tire diametrical direction, in the front view cross section, in view of burdening the intermediate annular portion 2 with the strain of the outer coupling portion 5 and uniformizing the deformation of the support structure body SS. In this case, the outer coupling portion 5 is not necessarily inclined with respect to the tire diametrical direction, but may be arranged in the same direction as the tire diametrical direction.

An angle $\theta$ at which the outer coupling portion 5 is inclined with respect to the tire diametrical direction is preferably not more than 30°. If the angle $\theta$ is too large, the non-pneumatic tire T cannot obtain a sufficient rigidity, and the tensile force is hard to be transmitted between the inner coupling portion 4 and the outer coupling portion 5.

Further, the angle $\theta$ at which the outer coupling portion 5 is inclined with respect to the tire diametrical direction is preferably not less than 5°. If the angle $\theta$ is too small, it is impossible to effectively burden the intermediate annular portion 2 with the strain of the outer coupling portion 5, and a pressure fluctuation within the ground surface becomes large based on an improvement in compression rigidity of the outer coupling portion 5.

As shown in FIG. 1, the present embodiment shows the example where two outer coupling portions 5 are inclined at the angle $\theta$ in a direction which is symmetrical with respect to the tire diametrical direction, and are arranged in a Y-shaped form as seen from the tire axial direction, together with one inner coupling portion 4 extending along the tire diametrical direction.

In this case, as shown in FIG. 2, a point at which the inner coupling portion 4 and the intermediate annular portion 2 are coupled is called an inner coupling point, and a point at which the outer coupling portion 5 and the intermediate annular portion 2 are coupled is called an outer coupling point, respectively. For convenience of the description, two adjacent inner coupling points in the inner coupling portion 4 are respectively called as inner coupling points 40a and 40b. Further, in the outer coupling points of two outer coupling portions 5 arranged in the Y-shaped form, one is called an outer coupling point 50a, and the other is called an outer coupling point 50b. Note that the inner coupling point is a point at which a thickness center line of the inner coupling portion 4 and a thickness center line of the intermediate annular portion 2 intersect, and the outer coupling point is a point at which a thickness center line of the outer coupling portion 5 and the thickness center line of the intermediate annular portion 2 intersect.

It is preferable to set a gap between the outer coupling point 50a and the outer coupling point 50b. Accordingly, the compression force of the inner coupling portion 4 is hard to be directly transmitted to the outer coupling portion 5, and it is possible to prevent the strain of the outer coupling portion 5 from being enlarged. Further, as shown in FIG. 2, in view of improving the uniformity, it is preferable that a distance between the inner coupling point 40a and the outer coupling point 50a is equal to a distance between the inner coupling point 40a and the outer coupling point 50b. In other words, it is preferable that two outer coupling portions 5 are arranged in a line symmetrical manner with respect to the inner coupling portion 4, by being spaced apart from each other. Note that this distance is set to a distance extending along the tire circumferential direction.

Further, assuming that d1 is a distance between the inner coupling point 40a and the inner coupling point 40b, and d2 is a distance between the inner coupling point 40a, and the outer coupling points 50a and 50b, d2 is preferably not less than 3 mm. If d2 is too short, the compression force of the inner coupling portion 4 is directly transmitted to the outer coupling portion 5 as mentioned above, and the strain of the outer coupling portion 5 becomes large, whereby the durability is deteriorated, and a change (a non-linearity) of the rigidity with respect to the load level becomes large. Further, it is preferable that d2 is smaller than d1/4. If d2 is too long, a problem occurs such that a sufficient rigidity cannot be obtained, and the tensile is hard to be transmitted.

The thickness t2 of the outer coupling portion 5 is preferably between 1 and 10% of the tire cross sectional height H1, and more preferably between 2 and 8%, in view of achieving the weight saving, the improvement in durability and the improvement in lateral rigidity, while sufficiently transmitting the force from the outer annular portion 3 and the intermediate annular portion 2. Further, in the non-pneumatic tire T according to the present invention, it is preferable that the thickness t2 of the outer coupling portion 5 is less than the thickness t1 of the inner coupling portion 4. It is possible to reduce the compression rigidity by making the thickness t2 of the outer coupling portion 5 less than the thickness t1 of the inner coupling portion 4, whereby it is possible to satisfactorily suppress the fluctuation in the circumferential direction of the tire rigidity.

The tensile modulus of the outer coupling portion 5 is preferably between 5 and 50 MPa, and more preferably between 7 and 20 MPa, in view of achieving the weight saving, the improvement in durability and the improvement in lateral rigidity, while sufficiently transmitting the force from the inner annular portion 1.

In the case of enhancing the tensile modulus of the outer coupling portion 5, it is preferable to use the fiber reinforced material obtained by reinforcing the elastic material by the fiber or the like.

As shown in FIG. 1, the present embodiment shows the example where the reinforcing layer 6 reinforcing the bending deformation of the outer annular portion 3 is provided in an outer side of the outer annular portion 3 of the support structure body SS. Further, in the present embodiment, as shown in FIG. 1, there is shown the example where a tread layer 7 is provided further outside the reinforcing layer 6. As the reinforcing layer 6 and the tread layer 7, it is possible to provide a structure similar to the belt layer of the conventional pneumatic tire. Further, it is possible to provide a pattern similar to the conventional pneumatic tire, as the tread pattern.

[Other Embodiments]

Roundness may be given to respective coupling portions of the inner annular portion 1, the intermediate annular portion 2, the outer annular portion 3, the inner coupling portion 4, and the outer coupling portion 5 so as to reinforce. A stress concentration in the coupling portion is reduced by the roundness, and a durability of the non-pneumatic tire T is improved.

Figure 3:
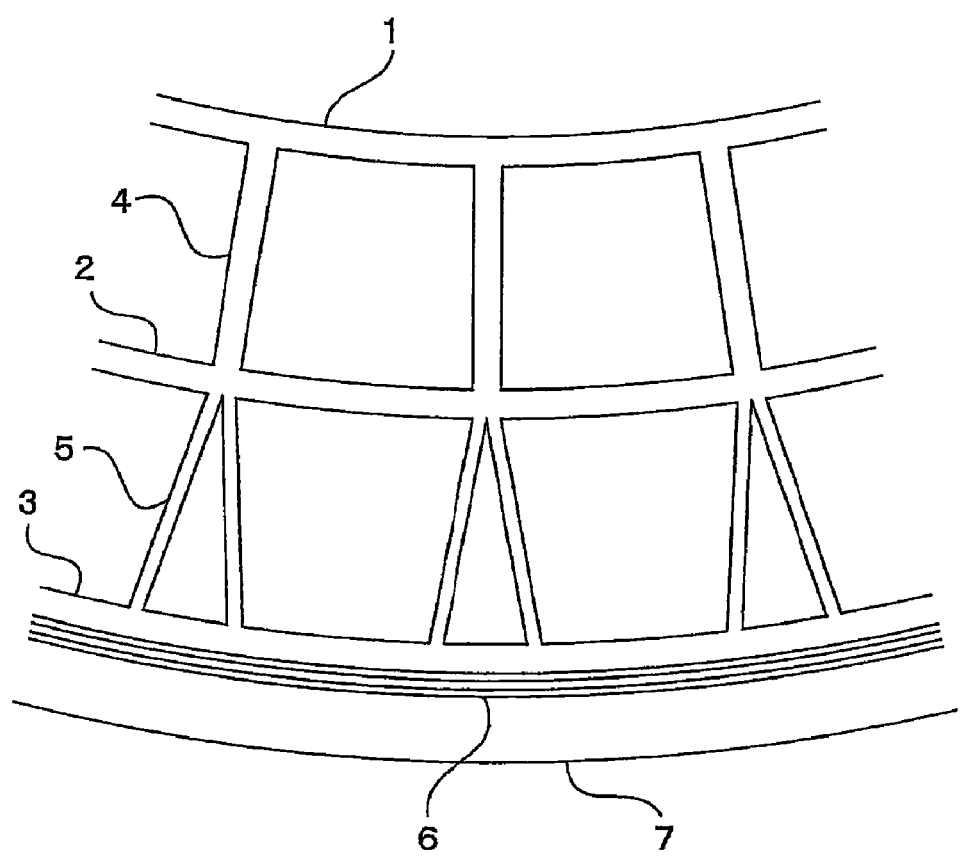
FIG. 3 is a partly enlarged view showing another embodiment of the non-pneumatic tire.

As shown in FIG. 2, the above-described embodiment shows the example where the gap is provided between the outer coupling point 50a and the outer coupling point 50b, however, the structure may be made, as shown in FIG. 3, such that the gap is not provided.

Further, in the present invention, the structure may be made such that the inner coupling portion 4 and the outer coupling portion 5 are divided into a plurality of sections in the tire width direction, and the positions of the inner coupling portion 4 and the outer coupling portion 5 are shifted from each other in the tire circumferential direction, for each zones divided in the tire width direction. FIG. 6 shows a non-pneumatic tire according to this embodiment, where FIG. 6A is a front elevational view, and FIG. 6B is a side elevational view. In the side elevational view, the coupling portion between the outer coupling portion 5 and the outer annular portion 3 is shown by a broken line. With this structure, the outer coupling portions 5 which are shifted from each other in the tire circumferential direction can improve the rigidity of the outer annular portion 3 between the outer coupling portions 5 which are adjacent in the tire circumferential direction in the adjacent zones. Accordingly, in cooperation with the effect of the intermediate annular portion 2, the fluctuation in the circumferential direction of the tire rigidity is hard to be generated by the positional relationship between the position of the outer coupling portion 5 and the center position of the ground surface, and it is possible to disperse the strain to each of the portions of the support structure body SS. Accordingly, it is possible to improve a riding quality, a noise performance and the like while improving the durability, and it is further possible to suppress a buckling of the ground portion between the outer coupling portions 5.

EXAMPLE

Hereinafter, an example or the like specifically showing the structure and the effect of the present invention will be described. Measurement was carried out by setting an evaluation item in the example as follows.

(1) Rigidity Fluctuation Test

A state of a rigidity change was tested by measuring a change of a deflection amount at the time while gradually increasing an applied vertical load. At the time of the test, the measurement was carried out in both the case where an outer end point of the outer coupling portion 5 (the spoke) exists on the ground center (a ground just below the spoke), and the case where a center position between the outer end point of the adjacent outer coupling portions 5 (the spokes) exists on the ground center (a ground between the spokes), and it was studied how a difference between the both vertical rigidities (a rigidity fluctuation) changes.

(2) Maximum Ground Pressure

Maximum ground pressures within the respective ground surfaces are averaged in the case where the outer end point of the outer coupling portion 5 (the spoke) exists on the ground center, and the case where the center position between the outer end point of the adjacent outer coupling portions 5 (the spokes) exists on the ground center, at the time of applying a vertical load 2500 N, and are indicated by an index number by setting a comparative example 1 to 100. The smaller the value is, the more excellent it is.

(3) Variance of Ground Pressure

A distribution of the ground pressure of the ground surface is measured in respective ground states, while gradually rolling (rotating) the non-pneumatic tire, that is, gradually changing the position of the outer end point of the outer coupling portion 5 (the outer spoke) with respect to the center position of the ground surface, in a state in which the vertical load 2500 N is applied. The variance of the ground pressure in each of the ground states is then calculated based on the distribution of the ground pressure, and the value of the variance of the ground pressure in the ground state in which the value of the variance becomes maximum is evaluated. It is indicated by an index number by setting the maximum value of the variance of the ground pressure in the comparative example 1 to 100, and the smaller the value is, the more excellent it is.

Example 1

Figure 5:
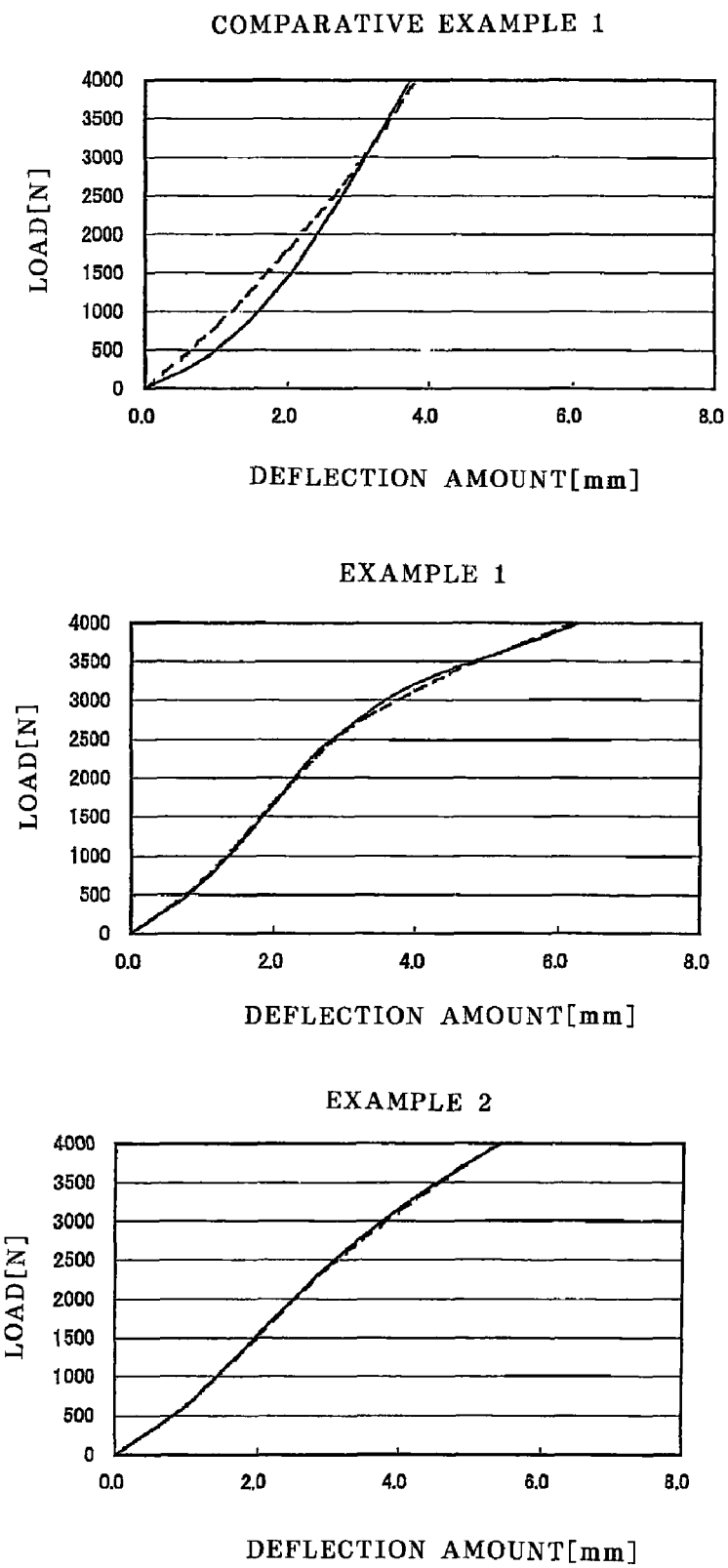
FIG. 5 show graphs indicating results of rigidity fluctuation tests in examples and the comparative example.
Figure 7A:
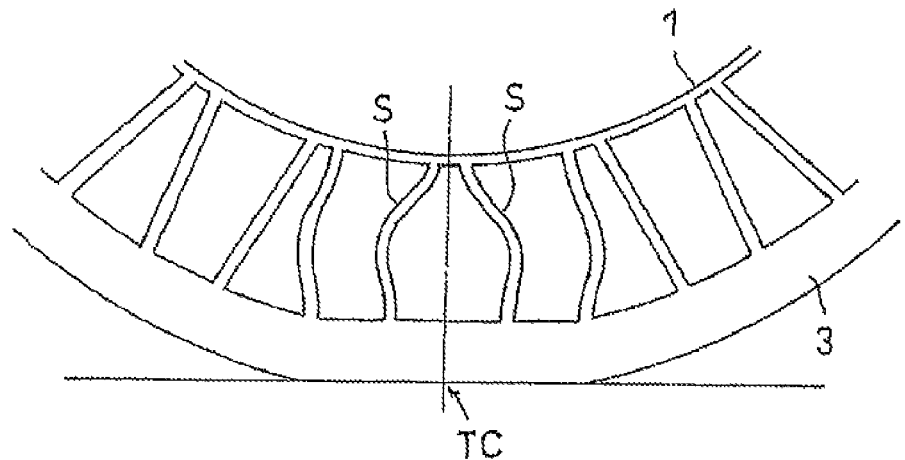
FIGS. 7A and 7B are explanatory views for describing a problem of a conventional non-pneumatic tire.
Figure 7B:
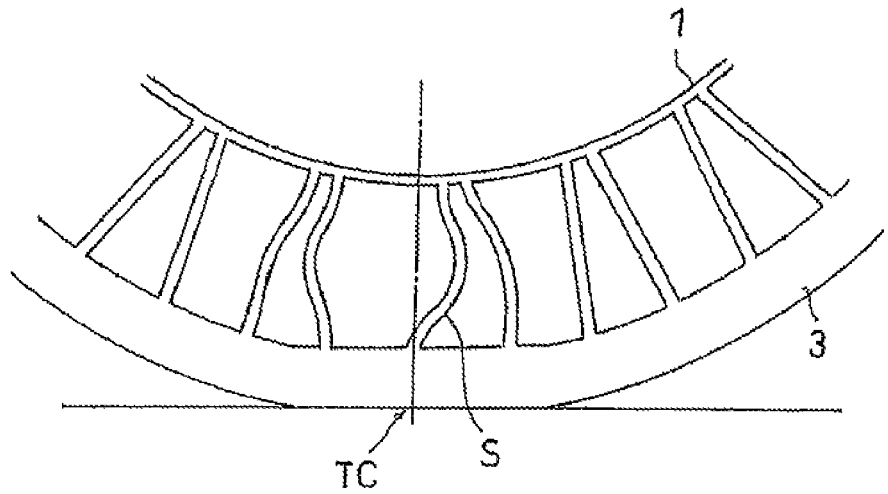

The above-mentioned performance was evaluated by preparing a non-pneumatic tire having the support structure body provided with the inner ring (corresponding to the inner annular portion 1), the intermediate ring (corresponding to the intermediate annular portion 2), the outer ring (corresponding to the outer annular portion 3), the inner spoke (corresponding to the inner coupling portion 4), and the outer spoke (corresponding to the outer coupling portion 5), three layers of reinforcing layers provided in the outer periphery thereof, and the tread rubber, in accordance with dimensions, physical properties and the like shown in Table 1. In the example 1, the inner coupling portion 4 and the outer coupling portion 5 were arranged as shown in FIG. 3. In other words, the outer coupling portion 5 was arranged in such a manner that no gap is provided between the outer coupling point 50a and the outer coupling point 50b. Result of the rigidity fluctuation test is shown in FIG. 5. Results of the maximum ground pressure and the variance of the ground pressure are shown together in Table 1.

Example 2

In the same manner as the example 1, the above-mentioned performance was evaluated by forming the support structure body provided with the inner ring, the intermediate ring, the outer ring, the inner spoke, and the outer spoke, and preparing the non-pneumatic tire having three layers of reinforcing layers provided in the outer periphery thereof, and the tread rubber, in accordance with dimensions, physical properties and the like shown in Table 1. In the example 2, the inner coupling portion 4 and the outer coupling portion 5 were arranged as shown in FIG. 2. In other words, the outer coupling portion 5 was arranged in such a manner that a gap is provided between the outer coupling point 50a and the outer coupling point 50b. Result of the rigidity fluctuation test is shown in FIG. 5. Results of the maximum ground pressure and the variance of the ground pressure are shown together in Table 1.

Comparative Example 1

Figure 4:
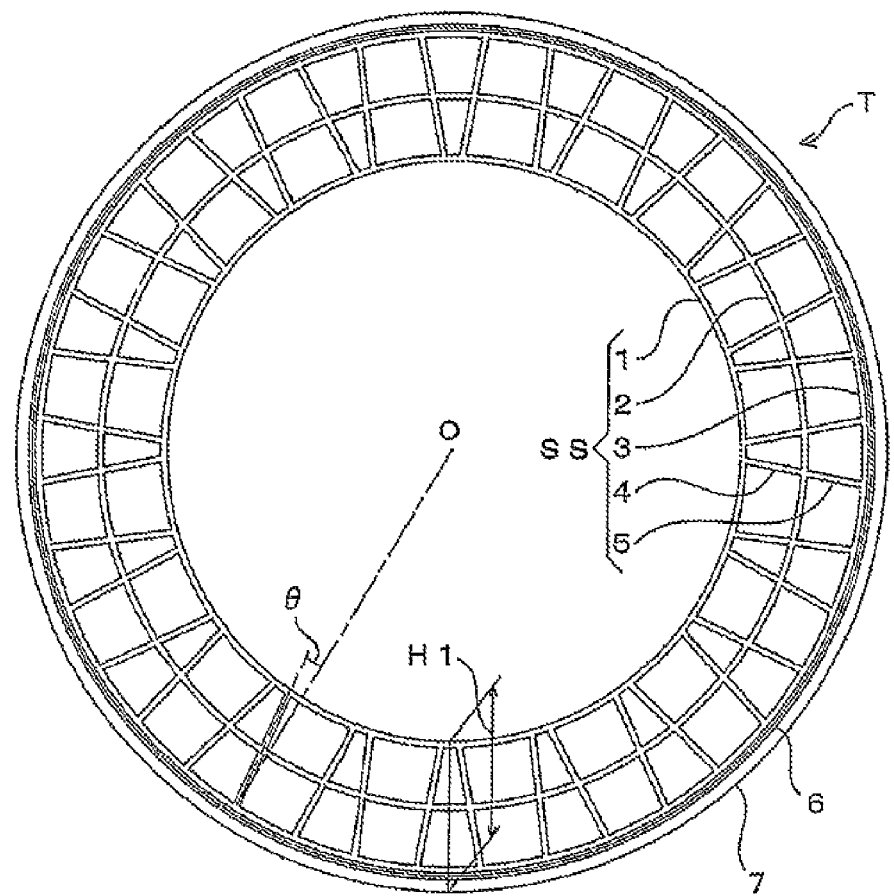
FIG. 4 is a front elevational view showing a non-pneumatic tire according to a comparative example.

In the same manner as the example 1, the above-mentioned performance was evaluated by forming the support structure body provided with the inner ring, the intermediate ring, the outer ring, the inner spoke, and the outer spoke, and preparing the non-pneumatic tire having three layers of reinforcing layers provided in the outer periphery thereof, and the tread rubber, in accordance with dimensions, physical properties and the like shown in Table 1. In the comparative example 1, the inner coupling portion 4 and the outer coupling portion 5 were arranged as shown in FIG. 4. In other words, the numbers of the inner coupling portions 4 and the outer coupling portions 5 are equal, different from the examples 1 and 2. Further, the inner coupling portion 4 and the outer coupling portion 5 couple the inner annular portion 1 and the outer annular portion 3, as one continuous coupling portion having the same thickness. The angle θ at which the inner coupling portion 4 and the outer coupling portion 5 are inclined with respect to the tire diametrical direction is 12°. Result of the rigidity fluctuation test is shown in FIG. 5. Results of the maximum ground pressure and the variance of the ground pressure are shown together in Table 1.

Note that the widths in the axial direction of the rings were all set to 140 mm. Further, the support structure body was formed by using a metal mold having a space portion corresponding to the support structure body, filling a raw material liquid (isocyanate low end pre-polymer: Sofrannate manufactured by Toyo Rubber Industry Co., Ltd., setting agent: MOCA manufactured by Ihara Chemical Industry Co., Ltd.) of an elastic material (a polyurethane resin) in the space portion by using an urethane casting machine, and solidifying.

TABLE 1

|  | Data and physical properties | Example 1 | Example 2 | Comparative example 1 |
|---|---|---|---|---|
| Inner ring | Inner diameter [mm] | 177.4 | 177.4 | 177.4 |
|  | Thickness [mm] | 3 | 3 | 3 |
|  | Tensile modulus [MPa] | 46 | 46 | 46 |
| Inner ring reinforcement | Cord cross sectional area [mm$^2$] | 2.1 | 2.1 | 2.1 |
|  | Circumferential direction cord striking number [number/25.4 mm] | 3 | 3 | 3 |
|  | Cord angle [deg] | 0 | 0 | 0 |
|  | Width direction cord striking number [number/25.4 mm] | 3 | 3 | 3 |
|  | Cord angle [deg] | 90 | 90 | 90 |
|  | Cord tensile modulus [MPa] | 10980 | 10980 | 10980 |
| Intermediate ring | Inner diameter [mm] | 212.9 | 212.9 | 180.4 |
|  | Thickness [mm] | 4 | 4 | 4 |
|  | Tensile modulus [MPa] | 46 | 46 | 46 |
| Intermediate ring reinforcement | Cord cross sectional area [mm$^2$] | 2.1 | 2.1 | 2.1 |
|  | Circumferential direction cord striking number [number/25.4 mm] | 3 | 3 | 3 |
|  | Cord angle [deg] | 0 | 0 | 0 |
|  | Width direction cord striking number [number/25.4 mm] | 3 | 3 | 3 |
|  | Cord angle [deg] | 90 | 90 | 90 |
|  | Cord tensile modulus [MPa] | 10980 | 10980 | 10980 |
| Outer ring | Inner diameter [mm] | 249.4 | 249.4 | 249.4 |
|  | Thickness [mm] | 3 | 3 | 3 |
|  | Tensile modulus [MPa] | 46 | 46 | 46 |
| Outer ring reinforcement | Cord cross sectional area [mm$^2$] | 2.1 | 2.1 | 2.1 |
|  | Circumferential direction cord striking number [number/25.4 mm] | 3 | 3 | 3 |
|  | Cord angle [deg] | 0 | 0 | 0 |
|  | Width direction cord striking number [number/25.4 mm] | 3 | 3 | 3 |
|  | Cord angle [deg] | 90 | 90 | 90 |
|  | Cord tensile modulus [MPa] | 10980 | 10980 | 10980 |
| Inner spoke | Spoke number [number] | 40 | 40 | 40 |
|  | Angle of inclination θ [deg] | 0 | 0 | 12 |
|  | Thickness [mm] | 4 | 4 | 6 |
|  | Tensile modulus [MPa] | 46 | 46 | 46 |
|  | d1 [mm] | 17 | 17 | — |
| Outer spoke | Spoke number [number] | 40 | 80 | 80 |
|  | Angle of inclination θ [deg] | 14 | 10 | 12 |
|  | Thickness [mm] | 3 | 3 | 6 |
|  | Tensile modulus [MPa] | 46 | 46 | 46 |
|  | d2 [mm] | 1.5 | 4 | — |
| Reinforcing layer 1 | Cord line diameter [mm] | 0.25 | 0.25 | 0.25 |
|  | Cord striking number [number/25.4 mm] | 23 | 23 | 23 |
|  | Cord tensile modulus [MPa] | 1846 | 1846 | 1846 |
|  | Cord angle [deg] | 20 | 20 | 20 |
| Reinforcing layer 2 | Cord line diameter [mm] | 0.25 | 0.25 | 0.25 |
|  | Cord striking number [number/25.4 mm] | 23 | 23 | 23 |
|  | Cord tensile modulus [MPa] | 1846 | 1846 | 1846 |
|  | Cord angle [deg] | −20 | −20 | −20 |
| Reinforcing layer 3 | Cord line diameter [mm] | 0.25 | 0.25 | 0.25 |
|  | Cord striking number [number/25.4 mm] | 23 | 23 | 23 |
|  | Cord tensile modulus [MPa] | 1846 | 1846 | 1846 |
|  | Cord angle [deg] | 20 | 20 | 20 |
| Tread rubber | Thickness [mm] | 8 | 8 | 8 |
|  | Tensile modulus [MPa] | 2.6 | 2.6 | 2.6 |
| Maximum ground pressure | Maximum value including ground state difference (the lower is better) | 68 | 63 | 100 |

TABLE 1-continued

| | Data and physical properties | Example 1 | Example 2 | Comparative example 1 |
|---|---|---|---|---|
| Variance of ground pressure | Average value of ground state differences (the lower is better) | 54 | 51 | 100 |

From the results of Table 1 and FIG. 5, the following matters are known. The non-pneumatic tires according to the examples 1 and 2 have the smaller rigidity fluctuation due to the positional relationship between the spoke position and the ground surface center position, in comparison with the comparative example 1. Further, the example 2 has the smaller deflection amount in the high load region, in comparison with the example 1. Further, comparing the example 2 with the example 1, the example 2 has the smaller rigidity fluctuation (the non-linearity) with respect to the load, in comparison with the example 1, and the tire characteristic is stable under the used condition of the vehicle installed expected load. Further, it is superior in the points of the pressure distribution on the ground surface and the maximum ground pressure. In other words, this indicates a reduction of the impact noise caused by the pressure fluctuation.

What is claimed is:

1. A non-pneumatic tire comprising:
a support structure body supporting a load from a vehicle, wherein the support structure body includes: an inner annular portion, an intermediate annular portion concentrically provided in an outer side of the inner annular portion, an outer annular portion concentrically provided in an outer side of the intermediate annular portion, a plurality of inner coupling portions coupling the inner annular portion and the intermediate annular portion, and a plurality of outer coupling portions coupling the outer annular portion and the intermediate annular portion, and
wherein the number of the outer coupling portions is larger than the number of the inner coupling portions.

2. The non-pneumatic tire according to claim 1, wherein the outer coupling portion is inclined with respect to a tire diametrical direction.

3. The non-pneumatic tire according to claim 1, wherein two of the outer coupling portions are inclined in a direction which is symmetrical with respect to a tire diametrical direction, the two outer coupling portions and one of the inner couplings portions being arranged in a Y-shaped form as seen from a tire axial direction.

4. The non-pneumatic tire according to claim 1, wherein a thickness of the outer coupling portion is less than a thickness of the inner coupling portion.

5. The non-pneumatic tire according to claim 3, wherein a gap is provided between an outer coupling point at which one of the two outer coupling portions and the intermediate annular portion are coupled, and an outer coupling point at which the other of the two outer coupling portions and the intermediate annular portion are coupled.

6. The non-pneumatic tire according to claim 1, wherein an angle of the outer coupling portion with respect to the tire diametrical direction is not more than 30°.

* * * * *

UNITED STATES PATENT AND TRADEMARK OFFICE
CERTIFICATE OF CORRECTION

| | | |
|---|---|---|
| PATENT NO. | : 8,113,253 B2 | |
| APPLICATION NO. | : 12/624533 | |
| DATED | : February 14, 2012 | |
| INVENTOR(S) | : Koji Arakawa et al. | |

It is certified that error appears in the above-identified patent and that said Letters Patent is hereby corrected as shown below:

Col 16, line 22, delete "couplings" and insert --coupling--.

Signed and Sealed this
Fifteenth Day of May, 2012

David J. Kappos
*Director of the United States Patent and Trademark Office*